United States Patent [19]

Kant

[11] Patent Number: 4,592,231

[45] Date of Patent: Jun. 3, 1986

[54] DEVICE FOR THE ELECTRIC MEASUREMENT OF A LIQUID LEVEL

[75] Inventor: Bernhard Kant, Eschborn, Fed. Rep. of Germany

[73] Assignee: VDO Adolf Schindling AG, Frankfurt am Main, Fed. Rep. of Germany

[21] Appl. No.: 620,888

[22] Filed: Jun. 15, 1984

[30] Foreign Application Priority Data

Jun. 15, 1983 [DE] Fed. Rep. of Germany ....... 3321562

[51] Int. Cl.⁴ ...................... G01F 23/24; G01F 23/26
[52] U.S. Cl. ................................... 73/295; 73/304 C; 324/61 P; 138/121; 138/139; 174/47; 361/284
[58] Field of Search ............. 73/290 R, 304 R, 304 C, 73/308, 327, 295; 220/85 S; 324/158 P, 60 C, 61 P, 65 P; 340/620, 618; 116/227; 361/284; 174/47; 138/121, 139, 173

[56] References Cited

U.S. PATENT DOCUMENTS

| 511,188 | 12/1893 | Barnard ................................. 174/47 |
| 1,720,213 | 7/1929 | Fuchs et al. ..................... 174/131 R |
| 2,802,975 | 8/1957 | Weber, Jr. ......................... 324/61 P |
| 3,578,777 | 5/1971 | DeGain ................................. 138/173 |
| 3,605,817 | 9/1971 | Bauman et al. ..................... 138/121 |

FOREIGN PATENT DOCUMENTS

| 206624 | 3/1956 | Australia ............................. 361/284 |
| 3108969 | 9/1982 | Fed. Rep. of Germany . |

*Primary Examiner*—Charles Frankfort
*Assistant Examiner*—Thomas B. Will
*Attorney, Agent, or Firm*—Martin A. Farber

[57] ABSTRACT

A device for the electric measurement of the level of a liquid in a container has a protective tube (1) within which a conductive foil (10) is arranged twisted. The protective tube is a corrugated tube with corrugations (2, 3). These corrugations (2, 3) have interruptions (4, 5, 7, 8). The interruptions lie along two helical lines (6, 8). The conductive foil (10) is pushed with its longitudinal edges (11, 12) into these interruptions (4, 5) which lie on two helical lines (6, 9). In order to permit of easy bending of the entire device, the conductive foil (10) has incisions (13, 14) which extend from both longitudinal edges (11, 12) up to the center of the conductive foil (10).

7 Claims, 6 Drawing Figures

DEVICE FOR THE ELECTRIC MEASUREMENT OF A LIQUID LEVEL

FIELD AND BACKGROUND OF THE INVENTION

The invention relates to a device for the electric measurement of a liquid level, in general.

The invention relates particularly to a device for the electric measurement of the level of a liquid contained within a container, having a conductive foil such as a temperature-dependent, externally electrically heated resistance foil immersed in the liquid and surrounded by a protective tube, the total resistance of which foil, detectable by an evaluation circuit, is dependent on the level of the liquid in the container. Alternately, capacitance foil bearing two conductors are used to form a capacitor, the conductive foil being developed in strip shape and being held within the protective tube by holding elements acting on at least one of its longitudinal edges in such a manner that both of its surfaces can be washed over by the liquid.

Containers in which a liquid level must be measured are frequently of rather irregular shape. Automobile gasoline tanks frequently have very complicated shapes in order to make optimal use of the space available and to permit the largest possible tank volume. Such container configurations frequently make it impossible for the device for the electric measurement of the liquid level to extend in a straight line down to the lowest point in the container. It is then necessary to bend the protective tube together with the conductive foil more strongly so that it can follow the construction of the container. With previous attempts to build such liquid measurement devices, the flexibility was not sufficient in all cases.

It is an object of the invention to further develop a device of the aforementioned type in such a manner that the greatest possible radial bending in all radial directions of the protective tube with installed conductive foil is possible.

SUMMARY OF THE INVENTION

This object is achieved in accordance with the invention by the fact that the conductive foil (10) has radial incisions (13, 14) distributed over its length and is held twisted around its longitudinal axis in the holding elements (interruptions 4, 5, 7, 8) of the protective tube.

By the incisions and the twisted arrangement of the conductive foil it can be bent in all directions without the conductive foil crumpling or tearing. Thus the device of the invention can be adapted by bending even to more complicated shapes of container so that it is capable of dependably entering into difficultly accessible regions of the container which form the lowest part of the container.

One advantageous embodiment of the invention resides in that radial incisions (13, 14) extend alternately from both longitudinal edges (11, 12) of the conductive foil (10) to the center of the conductive foil (10). This measure increases the flexibility of the conductive foil and thus of the entire device.

It also contributes to increasing and facilitating the flexibility if the protective tube (1) is a corrugated tube. This corrugated tube can be a plastic part which can be manufactured economically by extrusion.

One simple possibility of achieving the desired twisting upon the mounting of the conductive foil consists in providing the holding elements along a helical line (6, 9) within the protective tube (1).

The conductive foil can be held particularly accurately and firmly in the protective tube if the holding elements are provided within the protective tube (1) along two helices (6, 9) which are 180° apart from each other so that the conductive foil is held and guided on both longitudinal edges.

The installation of the conductive foil into the protective tube is made particularly simple if the sections of foil formed by the incisions (13, 14) are held in each case by at least one holding element (4, 5, 7, 8) between two incisions (13, 14), since the conductive foil can be simply pushed in from one end.

The holding elements are particularly simple and economical to manufacture if the holding elements are produced in each case by an interruption (4, 5, 7, 8) of a corrugation (2, 3), in the manner that a wall section of the inner corrugation, which section corresponds at least to the thickness of the conductive foil (10) is extended up to the diameter of the outer corrugation between the beginning and end of a corrugation (2, 3).

An alternative possibility for the development of the holding elements is characterized by the fact that the holding elements are produced by axial slits in the corrugations (2, 3), the width of said slits corresponding to the thickness of the conductive foil (10). The required slits are closed again to a large extent by the conductive foil after the installation of the conductive foil so that no large openings remain in the protective tube through which there might be an undesirably strong exchange of liquid between the inside of the protective tube and the rest of the container within which the level of the liquid is to be measured.

Instead of arranging the holding elements along a helix, they can also be arranged aligned with each other in several rows. Here the holding elements (15, 16) are arranged aligned with each other in a plurality of rows distributed uniformly over the circumference of the protective tube (1), and the foil regions formed by the incisions (13, 14) in the conductive foil (10) are inserted foil region to foil region into the holding element (15, 16) which next follows in one direction of rotation and at the same time is the next lower.

This embodiment also permits assembly by machine of the conductive foil by swinging the individual foil sections in each case through the required angle before the insertion.

In the embodiment in which the holding elements are arranged aligned with one another in a plurality of rows uniformly distributed over the circumference of the protective tube, the holding elements (15, 16) are advisedly in each case produced by inward directed beads (17, 18) between which there is formed a free space (19) which corresponds at least to the thickness of the conductive foil (10). In this embodiment, the protective tube with the holding elements can be produced particularly economically.

The invention permits of numerous possible embodiments.

With the above and other objects and advantages in view, the present invention will become more clearly understood in connection with the detailed description of preferred embodiments, when considered with the accompanying drawings, of which:

DETAILED DESCRIPTION OF THE PREFERRED EMBODIMENTS

Figure 1:
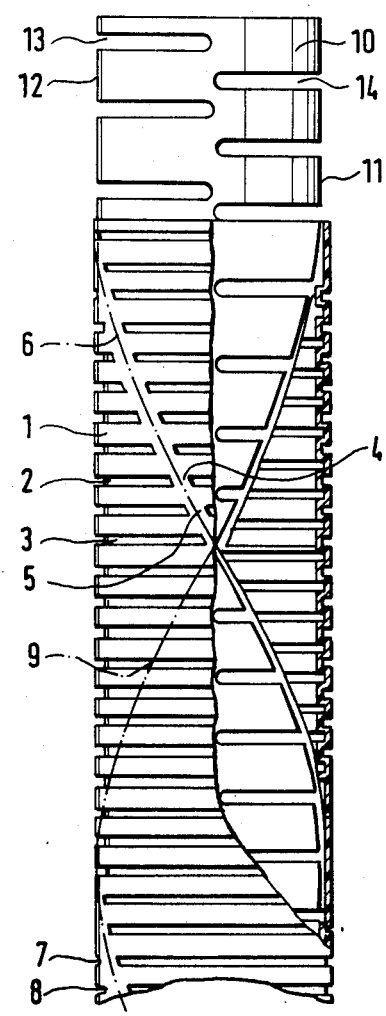
FIG. 1 shows a protective tube, partially in section and partially in elevation, with conductive foil of the device in accordance with the invention partially mounted.
Figure 1:
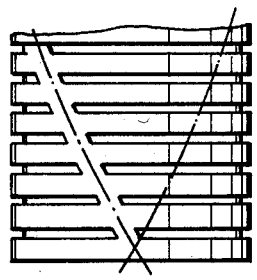
Figure 2:
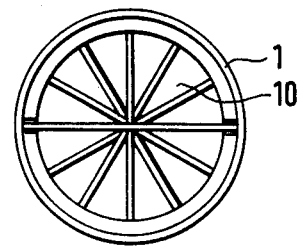
FIG. 2 is a top view of the arrangement of FIG. 1.

FIGS. 1 and 2 show a protective tube shown in FIG. 1 partially in section and partially in elevation. The protective tube 1 is a corrugated tube with inwardly directed corrugations, such as, for instance 2, 3. These corrugations 2, 3 do not extend all the way around but rather in each case have an interruption 4, 5. From corrugation 2 to corrugation 3 these interruptions 4, 5 are staggered in the same direction of rotation so that all interruptions 4, 5 lie on a helical line 6. 180° away from the interruptions 4, 5 further interruptions, for instance 7,8 of the corrugations are provided on a helical line 9.

All interruptions represent holding elements for a conductive foil 10 and hold the two longitudinal edges 11, 12 of such conductive foil 10. In order to permit the bending of the conductive foil 10 in all radial directions, incisions 13, 14 are provided in the conductive foil 10 extending from both longitudinal edges 11 and 12 and reaching up to the middle of the conductive foil. For assembly, the conductive foil 10 is pushed into the protective tube 1 from one end of the protective tube 1 in such a manner that the longitudinal edges 11, 12 slide along the helical lines 6, 9 through the interruptions 4, 5, 7, 8 of the corrugations 2, 3. In this way the conductive foil is twisted in itself and held from the beginnings and ends of the corrugations 2, 3 in the region of the interruptions 4, 5, 7, 8. FIG. 2 shows that the foil sections formed by the incisions 13, 14, upon the mounting of the conductive foil 10, have their front sides extending in spoke-like fashion in the protective tube 1 due to the helical arrangement of the interruptions 4, 5, 7, 8.

In the embodiment shown, the interruptions 4, 5, 7, 8 of the corrugations 2, 3 serve as holding elements for the conductive foil 10. An embodiment in which the corrugations extend circumferentially and are interrupted in each case at two opposite points by an axial slit in the protective tube 1 has not been shown. Such slits then exercise the same function as the interruptions 4, 5, 7, 8 in the embodiment which has been described. For this purpose they are slightly wider than the thickness of the conductive foil 10 and also extend over two helical lines 6, 9.

Figure 3:
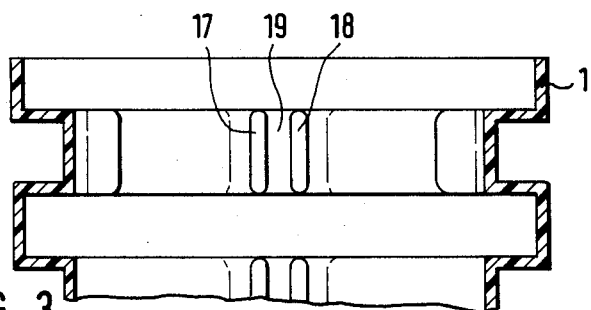
FIG. 3 is a longitudinal section through a part of a second embodiment of a protective tube developed in accordance with the invention.
Figure 4:
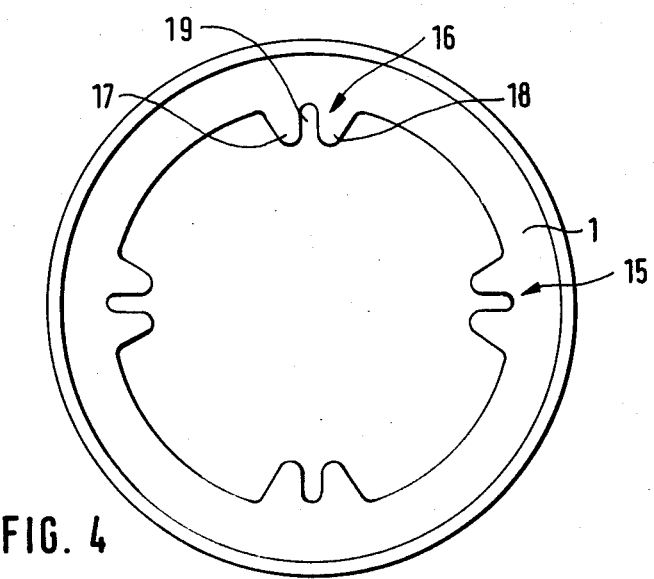
FIG. 4 is a top view of the protective tube of FIG. 3.

The protective tube 1 shown in FIGS. 3 and 4 is also developed as a corrugated tube. Within it there are provided, distributed over the inner circumference, rows of holding elements arranged aligned to each other, for example 15, 16. Each holding element 15, 16 consists of two beads 17, 18 between which a free space 19 is provided. The conductive foil 10 is shaped in exactly the same manner for the protective tube 1 as in the embodiment which was previously described. Upon assembly, the first foil region formed by an incision 13 is inserted, for instance, into the free space 19 of the holding element 16. The next foil region is then twisted by 90° and pushed into the holding element 15. Each further foil region is twisted by 90° and pushed into the next holding element as seen in clockwise direction, the conductive foil being in each case pushed further into the protective tube by an amount equal to the height of one foil region.

In the case of an electrically externally heated resistance foil, the foil is heated by passing electric current through the resistance. Both terminals of the resistance are led to the upper end of the protective tube and are connected as the resistance probe in U.S. Pat. No. 4,361,037.

The foil serves as the probe for the measurement of the liquid level. For a probe comprising a capacitive foil a corresponding well known AC measurement circuit is used.

Figure 5:
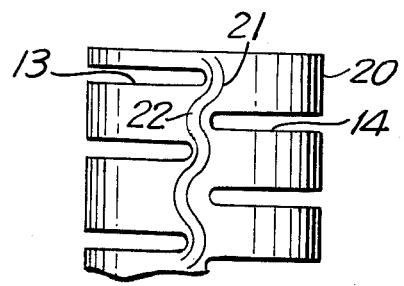
FIG. 5 shows a portion of a capacitive foil having two uniformly spaced conductors thereon.

In the case of a capacitive foil 20 having incisions 13 and 14 as depicted in FIG. 5, two electrical conductors 21 and 22 are uniformly spaced apart from each other, and are disposed on the foil 20 in a meander path between ends of the incisions 13 and 14.

Figure 6:
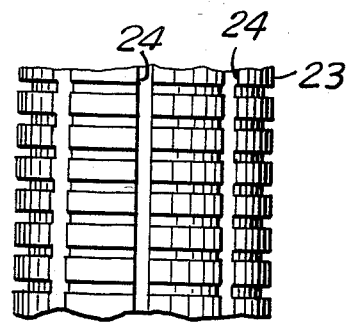
FIG. 6 shows an alternative protective tube with holding elements formed as slits.

FIG. 6 shows a portion of an alternative corrugated protective tube 23 having holding elements 24 which are formed as axial slits in the corrugations, the width of the slits corresponding to the thickness of the conductive or capacitive foil.

I claim:

1. A device for the electric measurement of the level of a liquid contained within a container, having a conductive foil such as a temperature-dependent, externally electrically heated resistance foil immersed in the liquid and surrounded by a protective tube, the total resistance of which foil, detectable by an evaluation circuit, is dependent on the level of the liquid in the container, or having a capacitance foil bearing two conductors which form a capacitor, the conductive or capacitive foil being developed in strip shape and being held within the protective tube by holding elements acting on at least one of its longitudinal edges in such a manner that both of its surfaces can be washed over by the liquid, the improvement wherein the conductive or capacitive foil has radial incisions distributed over its length and is held, twisted around its longitudinal axis, between the holding elements of the protective tube, the protective tube is a corrugated tube, said protective tube comprises a set of corrugations, each of said corrugations extending circumferentially part-way around the tube from a beginning of the corrugation to an end of the corrugation; and the holding elements are produced in each case by an interruption of a corrugation, in the manner that a wall section of an inwardly directed corrugation, which wall section corresponds at least to the thickness of the conductive or capacitive foil is extended up to the diameter of an outer corrugation between the beginning of a corrugation and the end of a corrugation.

2. The device as set forth in claim 1, wherein the radial incisions extend alternately from both longitudinal edges of the conductive or capacitive foil to the center of the conductive or capacitive foil, thereby to increase the flexibility of the foil and the measurement device.

3. The device as set forth in claim 1, wherein the holding elements are disposed along a helical line within the protective tube.

4. The device as set forth in claim 1, wherein the holding elements are provided within the protective tube along two helices which are 180° apart from each other.

5. The device as set forth in claim 1, wherein sections of foil formed by the incisions are held in each case by at least one holding element between two of the incisions.

6. The device as set forth in claim 1, wherein said holding elements are arranged aligned with each other in an array extending from one end of the tube and in a plurality of rows distributed uniformly over the inner circumferential surface of the protective tube; and the foil regions formed by the incisions in the conductive or capacitive foil are inserted into corresponding ones of said holding elements such that consecutive ones of said foil regions are positioned within individual ones of said holding elements located at increasing distance from said one end of the tube.

7. A liquid measurement device incorporating an electric element having an electric parameter, such as resistance or capacitance, which varies with the quantity of liquid in a container, the device comprising:

a housing formed as a flexible tube and configured for holding said element, said element comprising a flexible foil insertable within said housing; and wherein said foil has incisions directed outwardly from a longitudinal axis of the foil, said foil being positioned within said housing with said incisions oriented along radii of said housing, said foil being twisted about said axis with edges of said foil between said incisions contacting said housing; and wherein said protective tube comprises a set of corrugations, each of said corrugations extending circumferentially part-way around the tube from a beginning of the corrugation to an end of the corrugation; and the holding elements are produced in each case by an interruption of a corrugation, in the manner that a wall section of an inwardly directed corrugation, which wall section corresponds at least to the thickness of the conductive or capacitive foil is extended up to the diameter of an outer corrugation between the beginning of a corrugation and the end of a corrugation.

* * * * *